US012679004B2

(12) United States Patent
Zhao et al.

(10) Patent No.: US 12,679,004 B2
(45) Date of Patent: Jul. 14, 2026

(54) FILM ROLL POSITIONING DEVICE OF A FORMING OVER PART SYSTEM

(71) Applicant: GM GLOBAL TECHNOLOGY OPERATIONS LLC, Detroit, MI (US)

(72) Inventors: Xiang Zhao, Novi, MI (US); Hua-tzu Fan, Troy, MI (US); John Patrick Spicer, Plymouth, MI (US); Seog-Chan Oh, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 292 days.

(21) Appl. No.: 18/344,939

(22) Filed: Jun. 30, 2023

(65) Prior Publication Data

US 2025/0001649 A1     Jan. 2, 2025

(51) Int. Cl.
B29C 31/00          (2006.01)
B29C 63/02          (2006.01)
(52) U.S. Cl.
CPC ............ B29C 31/00 (2013.01); B29C 63/024 (2013.01)
(58) Field of Classification Search
None
See application file for complete search history.

(56) References Cited

U.S. PATENT DOCUMENTS 6,699,346 B1 *    3/2004    Habisreitinger ........ B29C 63/02
                                                  156/212

FOREIGN PATENT DOCUMENTS

DE          19809515 A1       9/1999
JP          S63308547 A    * 12/1988

OTHER PUBLICATIONS

Machine English translation of JP-S63308547-A, Accessed Nov. 7, 2025 (Year: 1988).*
Office Action dated Jan. 23, 2024 from German Patent Office for German Patent No. 10 2023 127 369.8.

* cited by examiner

*Primary Examiner* — Abbas Rashid
*Assistant Examiner* — Adrianna N Konves

(57)          ABSTRACT
A forming over part system including a first roll of a first paint film, a second roll of a second paint film, a film adhering device, and a film positioning device. The film adhering device receives the first paint film. The film adhering device is configured to adhere the first paint film to a component of a vehicle. The film positioning device is configured to hold the first and second rolls and based on actuation of an actuator, position the second roll of the second paint film to the film adhering device while the film adhering device is applying the first paint film to the component.

13 Claims, 8 Drawing Sheets

FILM ROLL POSITIONING DEVICE OF A FORMING OVER PART SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a forming over part (FOP) system, and more specifically, to a film roll positioning device of the forming over part system.

A vehicle may include a plurality of panels. Examples of the plurality of panels includes a side view mirror panel, a door panel, a hood panel, a liftgate panel, and another suitable panel. The plurality of panels may be made of a metal material, or another suitable material. Typically, each of the plurality of panels are colored to one or more colors.

In one example, one of the plurality of panels is colored to a first color. In another example, a first one of the plurality of panels is colored to a first color and a second one of the plurality of panels is colored to a second color that is different than the first color. In yet another example, one of the plurality of panels may be colored to the first color and the second color.

The plurality of panels may be colored using a spray-painting system. The spray-painting system includes spraying a colored paint to the one or more of the plurality of panels. In another example, the plurality of panels may be colored using a forming over part (FOP) system. The FOP system includes applying a colored film to the one or more of the plurality of panels.

SUMMARY

An example forming over part system is provided. The forming over part system includes a first roll of a first paint film, a second roll of a second paint film, a film adhering device, and a film positioning device. The film adhering device receives the first paint film. The film adhering device is configured to adhere the first paint film to a component of a vehicle. The film positioning device is configured to hold the first and second rolls and based on actuation of an actuator, position the second roll of the second paint film to the film adhering device while the film adhering device is applying the first paint film to the component.

In one example, the first paint film has a first color and the second paint film has a second color that is different than the first color.

In one example, the forming over part system includes a robot. The robot has an end effector that is configured to grasp and release the second roll.

In one example, the forming over part system includes a film support wheel. The film support wheel is disposed between the film adhering device and the film positioning device. The film support wheel is configured to guide the second paint film from the film positioning device to the film adhering device.

In one example, the forming over part system includes a blade. The blade is disposed between the film support wheel and the film positioning device. The blade is configured to cut the second paint film.

In one example, the forming over part system includes a camera. The camera is disposed between the film support wheel and the film positioning device and configured to capture an image of the second paint film.

In one example, the forming over part system includes a control module. The control module is configured to detect whether a defect exists in the second paint film based on the image captured by the camera.

An example forming over part system is provided. The forming over part system includes a first roll of a first paint film, a second roll of a second paint film, a film adhering device, and a film revolver. The film adhering device receives the first paint film. The film adhering device is configured to adhere the first paint film to a component of a vehicle. The film revolver has a plurality of slots. The film revolver is configured to hold the first and second rolls and based on actuation of an actuator, position the second roll of the second paint film to the film adhering device while the film adhering device is applying the first paint film to the component.

In one example, the film revolver includes a housing that has the plurality of slots and a core disposed within the housing.

In one example, the film revolver rotates about the core, based on actuation of the actuator.

In one example, each of the plurality of slots are annularly spaced apart about the core and one of the plurality of slots is configured to hold the second roll.

In one example, the forming over part system includes a robot. The robot has an end effector that is configured to grasp and release the second roll. The robot is configured to move the second roll between a first position and a second position based on input from a control module.

In one example, the first position is a position of one of the plurality of slots of the film revolver and the second position is a position on a paint film roll stand.

An example forming over part system is provided. The forming over part system includes a first roll of a first paint film, a second roll of a second paint film, a film adhering device, and a film conveyor. The film adhering device receives the first paint film. The film adhering device is configured to adhere the first paint film to a component of a vehicle. The film conveyor has a conveyor belt and a plurality of roll holders. The plurality of roll holders is attached to the conveyor belt and the plurality of roll holders is configured to hold the first and second rolls. The conveyor belt is configured to, based on actuation of an actuator, position the second roll of the second paint film to the film adhering device while the film adhering device is applying the first paint film to the component.

In one example, the film conveyor extends between a first conveyor end and a second conveyor end that is opposite the first conveyor end. The film conveyor includes a first wheel disposed at the first conveyor end and a second wheel disposed at the second conveyor end.

In one example, the conveyor belt extends around the first wheel and the second wheel.

In one example, the forming over part system includes a robot. The robot has an end effector that is configured to grasp and release the second roll.

In one example, the robot is configured to move the second roll between a first position to a second position, based on input from a control module.

In one example, the first position is a position of one of the plurality of roll holders of the film conveyor and the second position is a position on a paint film roll stand.

In one example, the robot is configured to load and unload the second roll to one of the plurality of roll holders, based on input from the control module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A component may be colored using paint. Examples of components include panels of a vehicle such as a side view mirror panel, a door panel, a hood panel, a liftgate panel, and another suitable panels. However, components may also be non-automotive components.

In one example, a spray-painting system is used to spray colored paint onto the component. However, spray-painting systems may involve a paint booth, a paint reservoir that holds the colored paint, paint tubing, a sprayer, and other parts.

In another example, a forming over part (FOP) system is used to apply a colored film to components. The FOP system includes a paint film roll holder and a film adhering device. A paint film roll may be disposed on the paint film roll holder. The component may be disposed within the film adhering device. The film adhering device is configured to receive a paint film of the paint film roll from the paint film roll holder and adhere the paint film onto the component.

However, the paint film roll holder may only be configured to hold one paint film roll at a given time. In one example, however, more than one paint film having different colors may be used. When more than one paint film is used, the operation of the film adhering device is stopped in order for a first paint film roll to be removed from the paint film roll holder and a second paint film roll to be loaded onto the paint film roll holder. This leads to increased downtime of the FOP system.

In view of the above, a forming over part system is provided that allows for feeding different colored paint film rolls to the film adhering device, resulting in decreased downtime for paint film roll changes.

Figure 1:
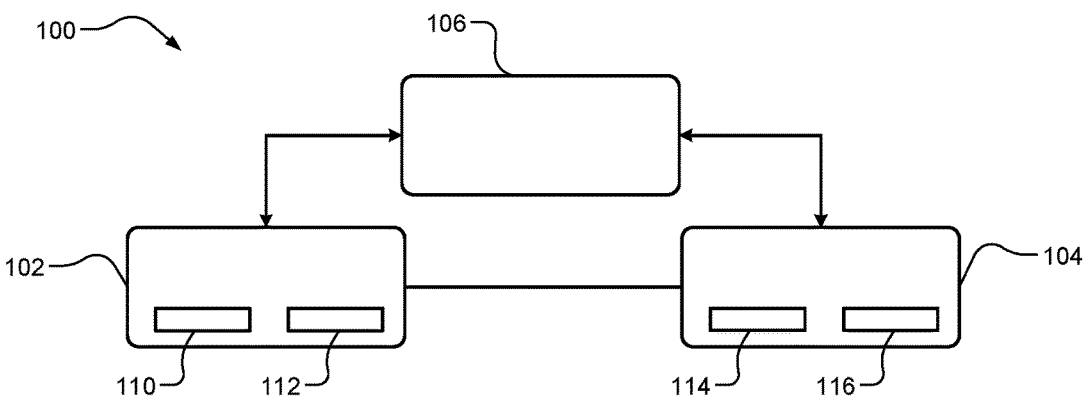
FIG. 1 is a functional diagram of an example forming over part system.

Referring now to FIG. 1, a functional diagram of an example forming over part system 100 is presented. The forming over part system 100 includes a film positioning device 102, a film adhering device 104, and a control module 106.

The film positioning device 102 houses a plurality of paint film rolls 110. The plurality of paint film rolls 110 may include a suitable number of paint film rolls 110, such as four rolls, six rolls, or another suitable number. In one example, a first roll of the plurality of paint film rolls 110 may have a first color and a second roll of the plurality of paint film rolls 110 may have a second color that is different than the first color. Alternatively, the first and second rolls of the plurality of paint film rolls 110 may be of the same color.

Each of the plurality of paint film rolls 110 includes a paint film that is in a rolled configuration (rolled up). The paint film includes a color layer. The color layer includes the respective color of the paint film.

In addition to the color layer, the paint film may include one or more sub-layers, such as a film layer, an adhesive layer, or one or more other suitable layers.

The film layer is a protective layer that may be disposed at a top surface of the paint film. The film layer may be transparent. The adhesive layer includes an adhesive that is used to adhere the paint film to another surface, such as a panel of a vehicle. The adhesive layer may be disposed at a bottom surface of the paint film. Each of the sub-layers may be smooth, etched, or have another suitable configuration.

The film positioning device 102 includes one or more first actuators 112. The first actuators 112 may be mechanical actuators, electrical actuators, or a combination thereof. The first actuators 112 receive input from the control module 106 and actuate based on the received input from the control module 106. More specifically, the film positioning device 102 is configured to rotate to position one of the plurality of paint film rolls 110 next to the film adhering device 104, based on actuation of the first actuator 112. The film positioning device 102 is configured to discard one of the plurality of paint film rolls 110 into a bin, based on actuation of the first actuator 112, when an amount (e.g., length) of a paint film of one of the plurality of paint film rolls 110 is less than a predetermined amount.

The film adhering device 104 is configured to adhere the paint film received from the film positioning device 102 to a component 114 of a vehicle, based on input from the control module 106. The component 114 is disposed within the film adhering device 104 and positioned below the paint film. In one example, the film adhering device 104 is configured to thermo-vacuum form the paint film onto component 114, based on input from the control module 106.

The film adhering device 104 includes one or more second actuators 116. The second actuators may be mechanical actuators, electrical actuators, or a combination thereof. The second actuators 116 receive input from the control module 106 and operate based on the received input from the control module 106. For example, one of the second actuators 116 is configured to move the component 114 vertically upward and thereby press the component 114 into the paint film (e.g., the adhesive layer), based on input from the control module 106. The paint film is adhered to the component 114.

The control module 106 is in communication with the film positioning device 102 and the film adhering device 104. The control module 106 is configured to store in memory a location of each of the plurality of paint film rolls 110 and a color of each of the plurality of paint film rolls 110. The control module 106 is configured to determine a usage of each of the plurality of paint film rolls 110, based on a number of cycles of the film adhering device 104 that has used the respective paint film roll 110. The control module 106 is configured to alert a user when an amount (e.g., length) of a paint film of one of the plurality of paint film rolls 110 is less than a predetermined amount, based on a usage of the respective paint film roll 110. In one example, the control module 106 may output an audible alert via a speaker when the amount of a respective paint film roll 110 is less than the predetermined amount.

Figure 7:
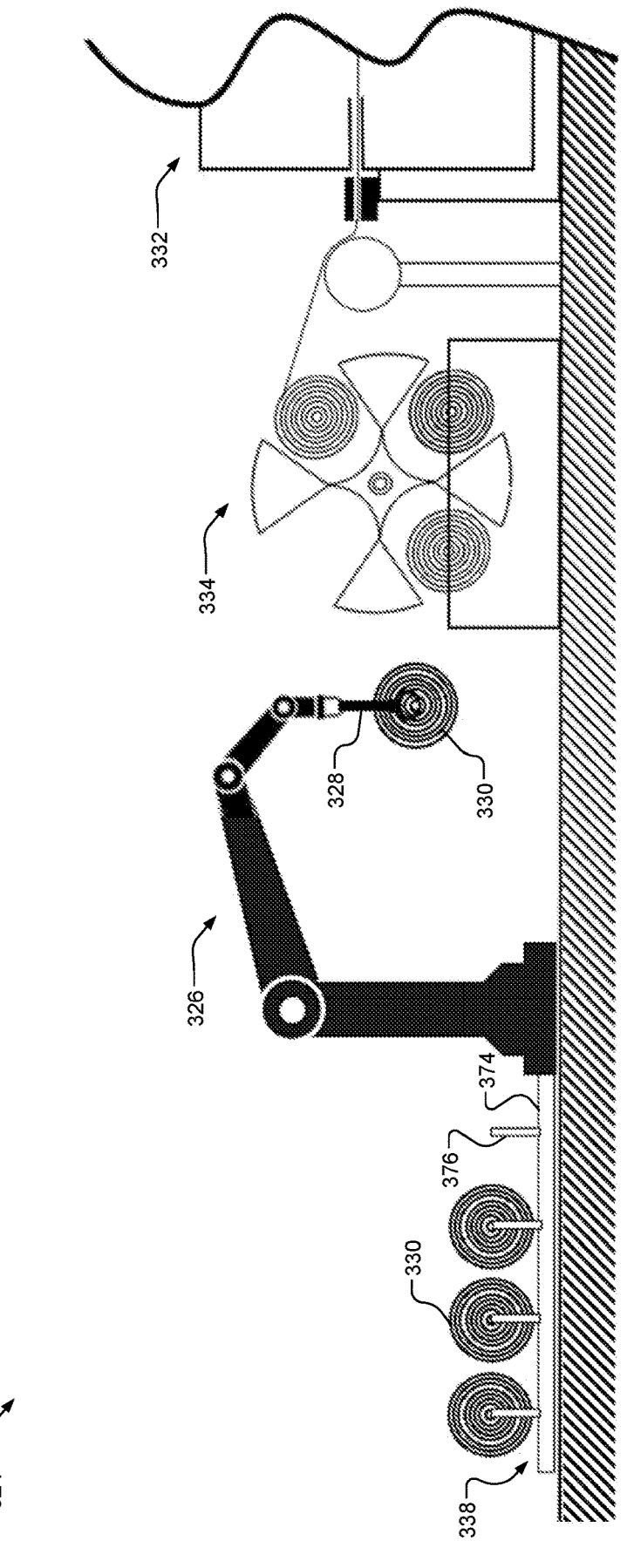
FIG. 7 is a schematic of an example forming over part system having an example robot.
Figure 8:
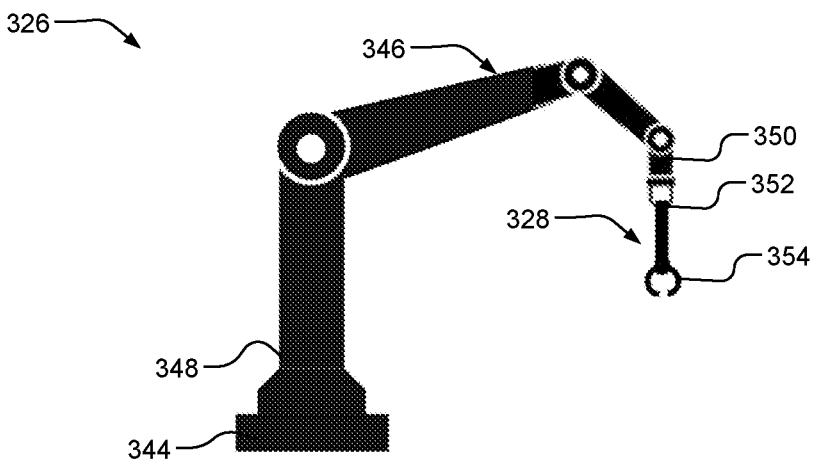
FIG. 8 is a schematic of the example robot shown in FIG. 7.
Figure 9:
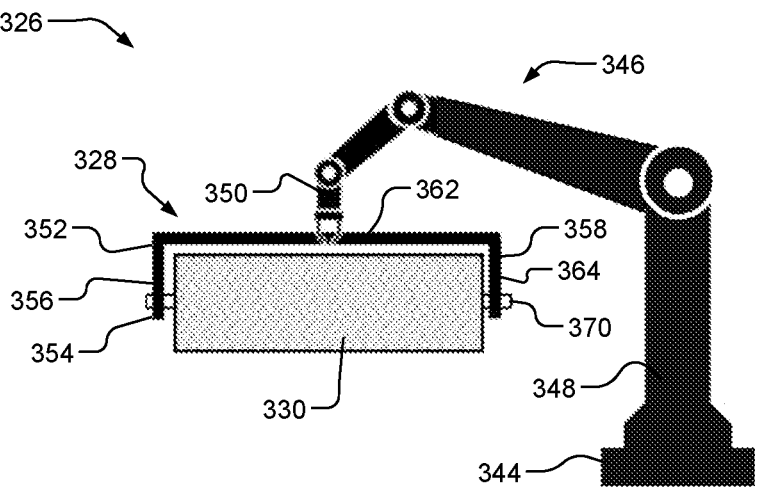
FIG. 9 is a schematic of the example robot shown in FIG. 7, where an example end effector of the robot is grasping a paint film roll.

In some configurations, the control module 106 may communicate with a robot (e.g., robot 326 shown in FIGS. 7-9). The robot is configured to operate based on input from the control module 106.

The control module 106 is configured to initiate when a pre-determined paint film having a pre-determined color is fed from the film positioning device 102 to the film adhering device 104. The control module 106 may request a first paint film having a first color to be fed into the film adhering device 104. The first actuator 112 of the film positioning device 102 is configured to position the first paint film next to the film adhering device 104, based on input from the control module 106. One of the second actuator 116 of the film adhering device 104 is configured to receive the first paint film from the film positioning device 102 and extend the first paint film across the film adhering device 104, based on input from the control module 106. Another one of the second actuators 116 of the film adhering device 104 is configured to move the component 114 into the first paint film, based on input from the control module 106, and adhere the first paint film to the component 114.

In one example, the film adhering device 104 is configured to adhere the first paint film of the first paint film roll having the first color to a first one of the components 114 and adhere the second paint film of a second paint film roll having a second color to a second one of the components 114, based on input from the control module 106. For example, the first color may be red, the second color may be yellow, and the component 114 may be a door panel of a vehicle. The film adhering device 104 is configured to adhere the first paint film having the red color to the first one of the door panels and adhere the second paint film having the yellow color to the second one of the door panels. However, the first and second colors may be another suitable color and the component 114 may be another suitable component.

The first actuator 112 of the film positioning device 102 is configured to move the second paint film to be positioned next to the film adhering device 104 and the film adhering device 104 is configured to receive the second paint film, based on input from the control module 106. The film adhering device 104 is configured to receive the second paint film simultaneously with adhering the first paint film to the component 114. The second paint film can be applied to the second one of the components 114 once the first paint film is vacuumed to the first one of the component 114.

In another example, more than one paint film may be adhered to a single component 114. The film adhering device 104 is configured to adhere the first paint film of the first paint film roll having the first color and the second paint film of the second paint film roll having the second color onto the component. The film adhering device 104 is configured to receive the second paint film simultaneously with the film adhering device 104 adhering the first paint film to the component 114. The second paint film can be applied once the first paint film is vacuumed to the component 114.

Accordingly, there is minimal to no time delay in between the first paint film being adhered to the component 114 and the second paint film being ready to be applied to the same component 114 or a second one of the component 114.

Figure 2:
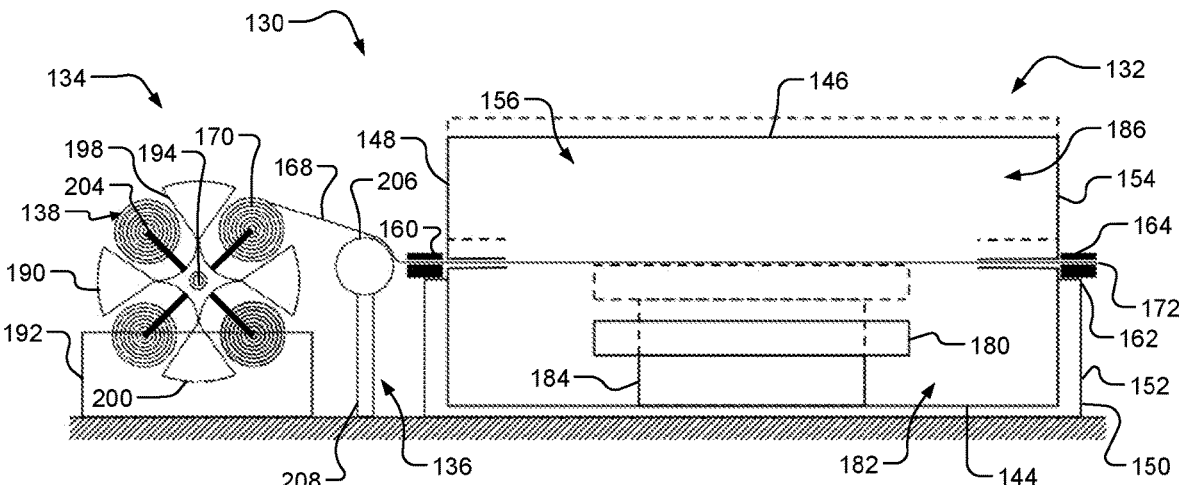
FIG. 2 is a schematic of an example forming over part system having a film revolver.

FIG. 2 is a schematic of an example forming over part system 130. The forming over part system 130 includes a film adhering device 132, a film positioning device 134, a film support wheel 136 and a control module (e.g., control module 106). The film positioning device 134 holds a plurality of paint film rolls 138.

The film adhering device 132 extends between a first device end 144 and a second device end 146 that is opposite to the first device end 144. The film adhering device 132 extends between a first device side 148 and a second device side 150 that is opposite to the first device side 148. A first (lower) housing 152 is disposed at the first device end 144 and a second (upper) housing 154 is disposed at the second device end 146. The second housing 154 is movable between a first housing position (shown in FIG. 2 in phantom lines) and a second housing position (shown in FIG. 2 in solid lines), based on input from the control module. When the second housing 154 is in the first housing position, the second housing 154 is spaced apart from the first housing 152. When the second housing 154 is in the second housing position, the second housing 154 is sealingly engaged with the first housing 152. The first and second housings 152, 154 define a vacuum sealed chamber 156 therein when the second housing 154 is in the second housing position. A vacuum device vacuums air out of the first and second housings 152 and 154.

A first clamp 160 is disposed at the first device side 148 and positioned at a top housing end 162 of the first housing 152. A second clamp 164 is disposed at the top housing end 162 of the first housing 152. The second clamp 164 is movable between a first clamp position and a second clamp position, based on input from the control module. When the second clamp 164 is in the first clamp position, the second clamp 164 is positioned adjacent to the first clamp 160 and disposed inboard of the first clamp 160. When the second clamp 164 is in the second clamp position (shown in FIG. 2), the second clamp 164 is positioned at the second device side 150 of the film adhering device 132. When the second clamp 164 transitions from the first clamp position to the second clamp position, the second clamp 164 translates from the first device side 148 inboard of the first clamp 160 to the second device side 150 of the film adhering device 132.

The first clamp 160 is configured to receive a paint film 168 of a first roll 170 of the plurality of paint film rolls 138 from the film positioning device 134. A first end 172 of the paint film 168 extends through the first clamp 160 to the second clamp 164 while the second clamp 164 is in the first clamp position. The second clamp 164 is configured to receive the first end 172 of the first roll 170 and clamp the first end 172. The second clamp 164 transitions from the first clamp position to the second clamp position to thereby move the paint film 168 across the film adhering device 132 and unroll the first roll 170. The first clamp 160 is configured to clamp the paint film 168 when the second clamp 164 is in the second clamp position.

A component 180 may be disposed in a first portion 182 of the vacuum sealed chamber 156 and positioned between the paint film 168 and the first housing 152. Examples of the component 180 include panels of a vehicle, such as a side view mirror panel, a door panel, a hood panel, a liftgate panel, and another suitable panel. The component 180 may also be a non-automotive component. The component 180 may be positioned on a component stand 184. The component stand 184 is attached to and disposed within the first housing 152. The component stand 184 is movable between a first stand position and a second stand position using a second actuator (e.g., second actuator 116), based on input from the control module. When the component stand 184 is in the first stand position (shown in solid lines in FIG. 2), the component 180 is spaced from the paint film 168. When the component stand 184 is in the second stand position (shown in phantom lines in FIG. 2), the component 180 is pressed into the paint film 168. As the component stand 184 transitions from the first stand position to the second stand position, the component stand 184 moves in a direction from the first device end 144 to the second device end 146 of the film adhering device 132.

A heater is configured to heat the paint film 168. The vacuum device is configured to vacuums air out of the first and second housings 152 and 154 to thereby secure the heated paint film 168 to the component 180. In one example, the second housing 154 may be attached to a compressed air tank. Compressed air may be released from the compressed air tank into a second portion 186 of the vacuum sealed chamber 156 between the paint film 168 and the second housing 154 when the component stand 184 is in the second stand position and the component 180 is pressed into the paint film 168. Compressed air is used to further secure the paint film 168 onto the component 180.

The film positioning device 134 is a film revolver. The film positioning device 134 is positioned adjacent to the film adhering device 132. In the illustrated example, the film positioning device 134 is positioned adjacent to the first device side 148 of the film adhering device 132. The film positioning device 134 includes a device housing 190 and a device stand 192.

The device housing 190 may be rotatable by applying a rotational force to the device housing 190. The device housing 190 may be rotatable using a first actuator (e.g., first actuator 112), based on input from the control module. More specifically, the device housing 190 is rotatable about a core 194 of the device housing 190. The device housing 190 is rotatable in a clockwise direction in the example shown. In another example, the device housing 190 is rotatable in a counterclockwise direction. In yet another example, the device housing 190 is rotatable in a clockwise and a counterclockwise direction.

The device housing 190 is illustrated as having a circular side view shape. However, the device housing 190 may have another suitable side view shape, such as square or triangular. The device housing 190 includes a plurality of slots 198 disposed annularly about the core 194. Each of the plurality of slots 198 are annularly spaced apart from each other. Each of the plurality of slots 198 extend from an outer surface 200 of the device housing 190 in a radially inward direction. In the illustrated example, the plurality of slots 198 includes four slots. However, another suitable number of slots may be used.

Each of the plurality of slots 198 is shaped and sized to receive one of the plurality of paint film rolls 138. A roll holder 204 is disposed between each of the plurality of slots

198. The roll holder 204 is configured to removably hold the plurality of paint film rolls 138 to the device housing 190.

In one example, a robot (e.g., robot 326) is configured to load and unload the plurality of paint film rolls 138 into and out of the plurality of slots 198 of the device housing 190.

The film support wheel 136 is disposed between the film adhering device 132 and the film positioning device 134. In some configurations, the film support wheel 136 may be directedly attached to the film adhering device 132. In other configurations, the film support wheel 136 may be directly attached to the film positioning device 134.

The film support wheel 136 includes a wheel 206 and a wheel stand 208. The wheel 206 is rotatable and supports movement of the paint film 168, such as while the second clamp 164 moves from the first clamp position to the second clamp position. The wheel stand 208 holds the wheel 206 such that the wheel 206 is positioned adjacent to the first clamp 160 of the film adhering device 132.

Figure 3:
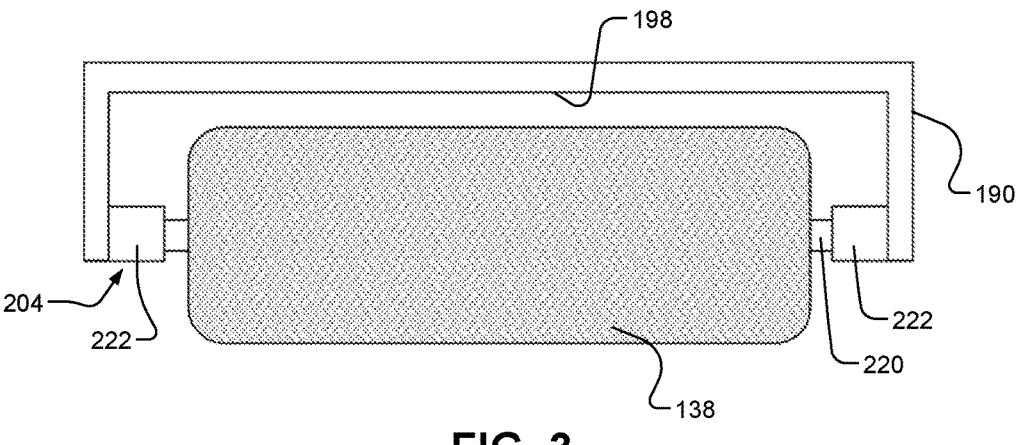
FIG. 3 is a schematic of an example paint film roll positioned within the film revolver shown in FIG. 2.

FIG. 3 is a schematic of the paint film roll 138 positioned within the film positioning device 134. In the illustrated example, a first rod 220 extends through each of the plurality of paint film rolls 138.

The first rod 220 is removably secured to the roll holder 204 of the device housing 190. The roll holder 204 includes a pair of receivers 222 disposed at each of the plurality of slots 198. The pair of receivers 222 are at least partially aligned with opposing ends of the first rod 220.

The first rod 220 may be pressed into the pair of receivers 222 to secure the paint film roll 138 to the device housing 190 in a press-fit configuration. The first rod 220 may be pulled out of the pair of receivers 222 to release the paint film roll 138 from the device housing 190. In another example, each of the pair of receivers 222 is a clamp. The pair of clamp are movable to clamp the first rod 220 to the device housing 190 and release the first rod 220 from the device housing 190, based on input from the control module.

In some configurations, the paint film roll 138 may not include a first rod extending through the paint film roll 138.

Figure 4:
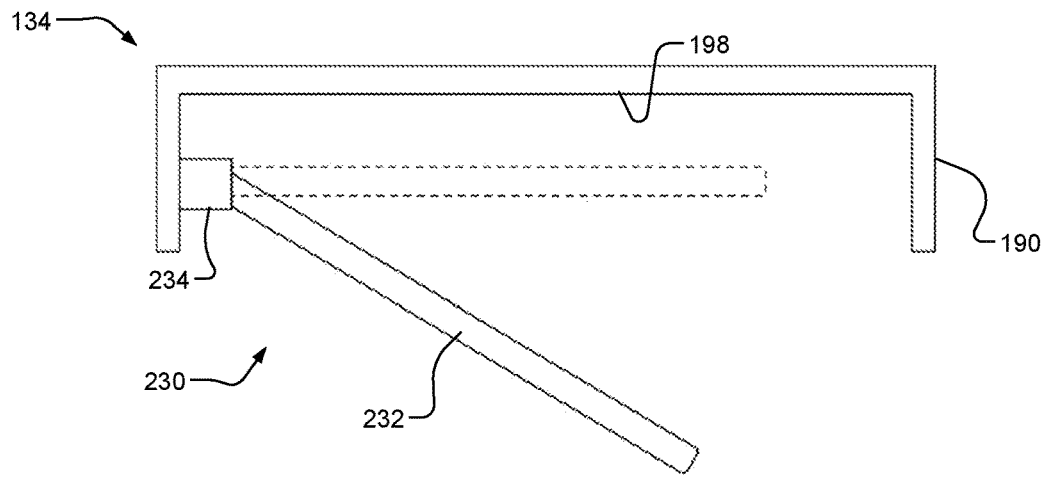
FIG. 4 is a schematic of an example roll holder of the example film revolver shown in FIG. 2.

FIG. 4 is a schematic of another example roll holder 230 of the example film positioning device 134.

The roll holder 230 includes a second rod 232 and a hinge 234. The second rod 232 is disposed within each of the plurality of slots 198 of the device housing 190. The second rod 232 is pivotally movable via the hinge 234 between a first rod position (shown in solid lines in FIG. 4) and a second rod position (shown in phantom lines in FIG. 4), based in input from the control module.

The hinge 234 is disposed within each of the plurality of slots 198 of the device housing 190. The hinge 234 is positioned at one end of the second rod 232 and attaches the second rod 232 to the device housing 190.

When the second rod 232 is in the first rod position, the second rod 232 is pivoted in a radially outward direction relative to the device housing 190. The second rod 232 may be positioned partially outside a respective slot of the plurality of slots 198. The second rod 232 is positioned to load the paint film roll 138 onto the device housing 190 or unload the paint film roll 138 from the device housing 190. More specifically, the robot may slide the paint film roll 138 onto and off of the second rod 232 to load and unload the paint film roll 138, respectively.

When the second rod 232 is transitioned from the first rod position to the second rod position, the second rod 232 is positioned within the respective slot 198 to secure the paint film roll 138 to the device housing 190.

Figure 5:
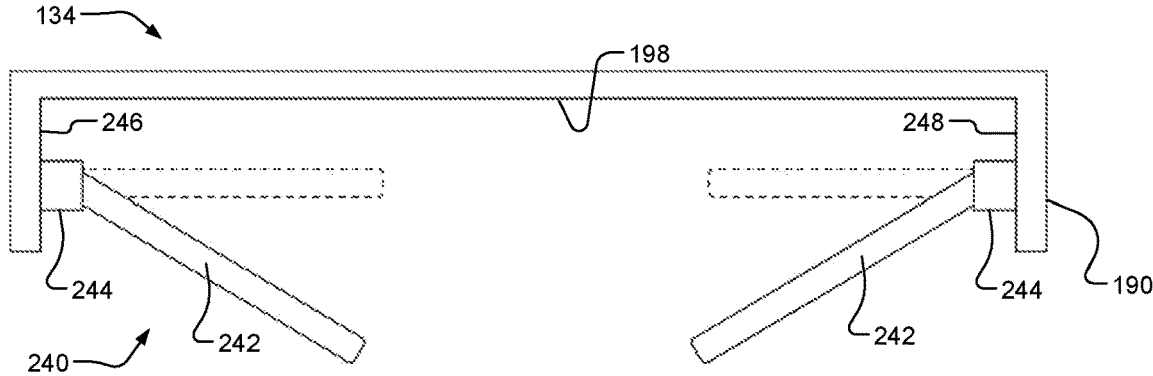
FIG. 5 is a schematic of an example roll holder of the example film revolver shown in FIG. 2.

FIG. 5 is a front view of another example roll holder 240 of the example film positioning device 134.

The roll holder 240 includes a pair of second rods 242 and a pair of hinges 244. A first one of the second rods 242 is positioned at a first side 246 of a respective slot 198. A second one of the second rods 242 is positioned at a second side 248 of the respective slot 198. The second side 248 is opposite to the first side 246. The first and second ones of the second rods 242 are spaced apart from each other. The first one of the second rods 242 pivotally moves using a first one of the pair of hinges 244. The second one of the second rods 242 pivotally moves using a second one of the pair of hinges 244.

The pair of second rods 242 are in a mirror image configuration with each other. The pair of the second rods 242 may move concurrently between a first rod position (shown in solid lines in FIG. 5) and a second rod position (shown in phantom lines in FIG. 5).

When the pair of second rods 242 are in the first rod position, the pair of second rods 242 are pivoted in a radially outward direction. The pair of second rods 242 may be partially positioned outside a respective slot of the plurality of slots 198. The pair of second rods 242 are positioned to load the paint film roll 138 onto the device housing 190 and unload the paint film roll 138 from the device housing 190. More specifically, the robot may insert and remove ends of the paint film roll 138 into and out of the pair of second rods 242 to load and unload the paint film roll 138, respectively.

When the pair of second rods 242 are transitioned from the first rod position to the second rod position, the pair of second rods 242 are at least partially received within the paint film roll 138 at opposing ends of the paint film roll 138 to secure the paint film roll 138 to the device housing 190. The pair of second rods 242 are aligned with each other. A spacing (distance) between adjacent ends of the pair of second rods 242 is less than a width of a paint film roll 138. Thus, the paint film rolls 138 are restricted from sliding off of the pair of second rods 242.

Another suitable design may be used to secure the paint film roll 138 to the film positioning device 134 and release the paint film roll 138 from the film positioning device 134.

Figure 6:
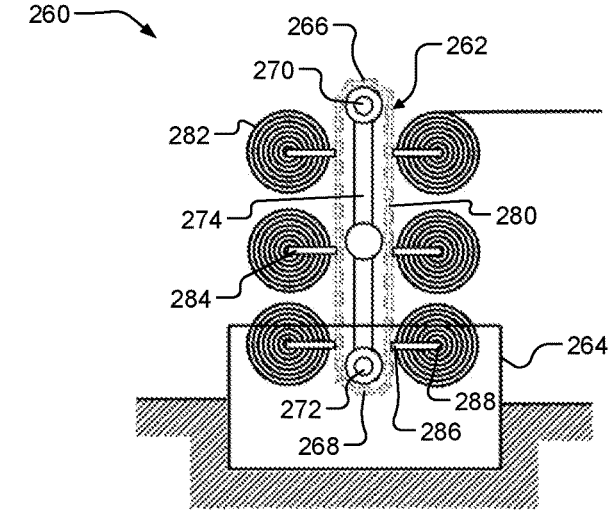
FIG. 6 is a schematic of an example film conveyor of a forming over part system.

FIG. 6 is a schematic of another example film positioning device 260.

The film positioning device 260 is a film conveyor. The film positioning device 260 includes a conveyor 262 and a stand 264. The conveyor 262 is rotatable. In one example, the conveyor 262 is rotatable in a clockwise direction. In another example, the conveyor 262 is rotatable in a counterclockwise direction. In yet another example, the conveyor 262 is rotatable in a clockwise and a counterclockwise direction.

The conveyor 262 extends between a first conveyor end 266 and a second conveyor end 268 that is opposite to the first conveyor end 266. A first wheel 270 is disposed at the first conveyor end 266 and a second wheel 272 is disposed at the second conveyor end 268. A support beam 274 extends between the first wheel 270 and the second wheel 272. The first wheel 270 and the second wheel 272 are rotatable.

A conveyor belt 280 is coupled to the first and second wheels 270, 272. More specifically, the conveyor belt 280 is in abutting contact with the first and second wheels 270, 272. In the illustrated example, the conveyor belt 280 includes chain. However, the conveyor belt 280 may include another suitable material.

A plurality of paint film rolls 282 is attached to the conveyor belt 280. In the illustrated example, six paint film rolls are attached to the conveyor belt 280. However, another suitable number of paint film rolls 282 may be attached to the conveyor belt 280.

Each of the plurality of paint film rolls 282 is removably attached to the conveyor belt 280 using a roll holder 284. The roll holder 284 may be positioned perpendicular to the conveyor belt 280. However, the roll holder 284 may be positioned in another suitable configuration relative to the conveyor belt 280.

The roll holder 284 extends between a first holder end 286 and a second holder end 288 that is opposite to the first holder end 286. The first holder end 286 is attached to the conveyor belt 280. The second holder end 288 is attached to one roll of the plurality of paint film rolls 282. The second holder end 288 of the roll holder 284 may have a U-shape, or another suitable shape.

Each of the plurality paint film roll 282 may be removably secured to the second holder end 288 of the roll holder 284, such as by a robot (e.g., robot 326 shown in FIGS. 7-9). In one example, and as described with reference to FIG. 3, each of the plurality of paint film rolls 282 may include a first rod (e.g., first rod 220) that extends through the respective paint film roll 282. The first rod may be removably attached to the roll holder 284 using a pair of receivers (e.g., pair of receivers 222).

In another example, and as described with reference to FIG. 4, the roll holder 284 may be the same as the roll holder 230. In yet another example, and as described with reference to FIG. 5, the roll holder 284 may be the same as the roll holder 240. Thus, the roll holder 284 will not be redescribed in detail.

Another suitable design may be used to secure the paint film roll 282 to the conveyor belt 280 and release the paint film roll 282 from the conveyor belt 280.

In one example, the conveyor belt 280 may be rotated around the support beam 274 by applying a rotational force to the conveyor belt 280. In another example, an actuator (e.g., first actuator 112), such as an electric motor, is configured to rotate the first and second wheels 270, 272, based on input from the control module. Rotation of the first and second wheels 270, 272 drives rotation of the conveyor belt 280 around the support beam 274. Rotation of the conveyor belt 280 thereby drives rotation of the plurality of paint film rolls 282 around the support beam 274.

FIG. 7 is a schematic of an example forming over part system 324 including an example robot 326. FIG. 8 is a schematic of the example robot 326 having an end effector 328. FIG. 9 is a schematic of the example robot 326, where the end effector 328 is grasping one of a plurality of paint film rolls 330.

The forming over part system 324 includes a film adhering device 332, a film positioning device 334, the robot 326, a paint film roll stand 338 and a control module (e.g., control module 106). The film adhering device 332 is the same as the film adhering device 132 of the forming over part system 130. The film positioning device 334 is the same as the film positioning device 134 of the forming over part system 130. Thus, the film adhering device 332 and the film positioning device 334 will not be redescribed in detail.

The robot 326 may have a suitable number of degrees of freedom (DOF), such as 6 DOF or higher. The robot 326 may include a base 344 and a robot arm 346. The robot arm 346 extends between a first arm end 348 and a second arm end 350 that is opposite to the first arm end 348. The first arm end 348 of the robot arm 346 is attached to the base 344. The second arm end 350 of the robot arm 346 is attached to the end effector 328.

The end effector 328 extends between a first end effector end 352 and a second end effector end 354 that is opposite to the first end effector end 352. The first end effector end 352 is attached to the second arm end 350 of the robot arm 346. The second end effector end 354 is configured as a clamp to grasp and release one of the plurality of paint film rolls 330, based on input from the control module. The end effector 328 extends between a first end effector side 356 and a second end effector side 358 that is opposite to the first end effector side 356.

The end effector 328 includes a top wall 362 and opposing sidewalls 364. The top wall 362 is disposed at the first end effector end 352 and extends between the first and second end effector sides 356, 358. A first one of the sidewalls 364 extends from the top wall 362 and is positioned at the first end effector side 356. The second one of the sidewalls 364 extends from the top wall 362 and is positioned at the second end effector side 358. Accordingly, the end effector 328 has a U-shape. However, the end effector 328 may have another suitable shape.

Each of the plurality of paint film rolls 330 may include a first rod 370 (e.g., first rod 220) that extends through the respective paint film roll 330. The second end effector end 354 end effector 328 of the robot 326 may grasp and release ends of the first rod 370, based on input from the control module.

In some configurations, the first rod 370 may not extend through each of the plurality of paint film rolls 330. As described with reference to FIG. 4, the end effector 328 may include a first roll holder that is the same as the roll holder 230. In another example, and as described with reference to FIG. 5, the end effector 328 may include a first roll holder that is the same as the roll holder 240. Thus, the first roll holder will not be redescribed in detail.

The paint film roll stand 338 includes a stand base 374 and a plurality of second roll holders 376. The plurality of second roll holders 376 extend from the stand base 374 and are spaced apart from each other along the stand base 374. In the illustrated example, the plurality of second roll holders 376 includes four roll holders. However, the plurality of second roll holders 376 may include another suitable number of second roll holders, such as six roll holders or eight roll holders.

Each of the plurality of second roll holder 376 is configured to hold one of the plurality of paint film rolls 330. In the illustrated example, a first one of the plurality of second roll holders 376 is holding a first one of the plurality of paint film rolls 330 that has a first color. A second one of the plurality of second roll holders 376 is holding a second one of the plurality of paint film rolls 330 that has a second color. A third one of the plurality of second roll holders 376 is holding a third one of the plurality of paint film rolls 330 that has a third color. The robot 326 is carrying a fourth one of the plurality of paint film rolls 330 from a fourth one of the plurality of second roll holders 376 to the film positioning device 334.

The robot 326 is configured to operate based on input from the control module. More specifically, the robot 326 is configured to change one of the paint film rolls 330 that are disposed within the film positioning device 334, based on input from the control module. Examples of input from the control module include a request for a predetermined color of a paint film roll 330 to be moved to a predetermined slot of the film positioning device 334, a notice when an amount (e.g., length) of a paint film of one of the paint film rolls 330 is below a predetermined threshold, and another suitable information.

The end effector 328 of the robot 326 is configured to grasp one of the paint film rolls 330 from the paint film roll stand 338, based on input from the control module of a selected color of the paint film roll 330. The robot 326 is configured to carry the one of the paint film roll 330 from the paint film roll stand 338 to the film positioning device 334, based on input from the control module of a selected route. The robot 326 is configured to release the paint film roll 330 into the film positioning device 334, based on input from the control module of a selected slot (e.g., slot 198) of the film positioning device 334.

The end effector 328 of the robot 326 is configured to grasp one of the paint film rolls 330 from one of the slots of the film positioning device 334, based on input from the control module of a selected slot of the film positioning device 334. The robot 326 is configured to carry the paint film roll 330 from the film positioning device 334 to the paint film roll stand 338, based on input from the control module of a selected route. The robot 326 is configured to release the paint film roll 330 onto the paint film roll stand 338, based on input from the control module of a selected second roll holder 376 of the paint film roll 330.

Figure 10:
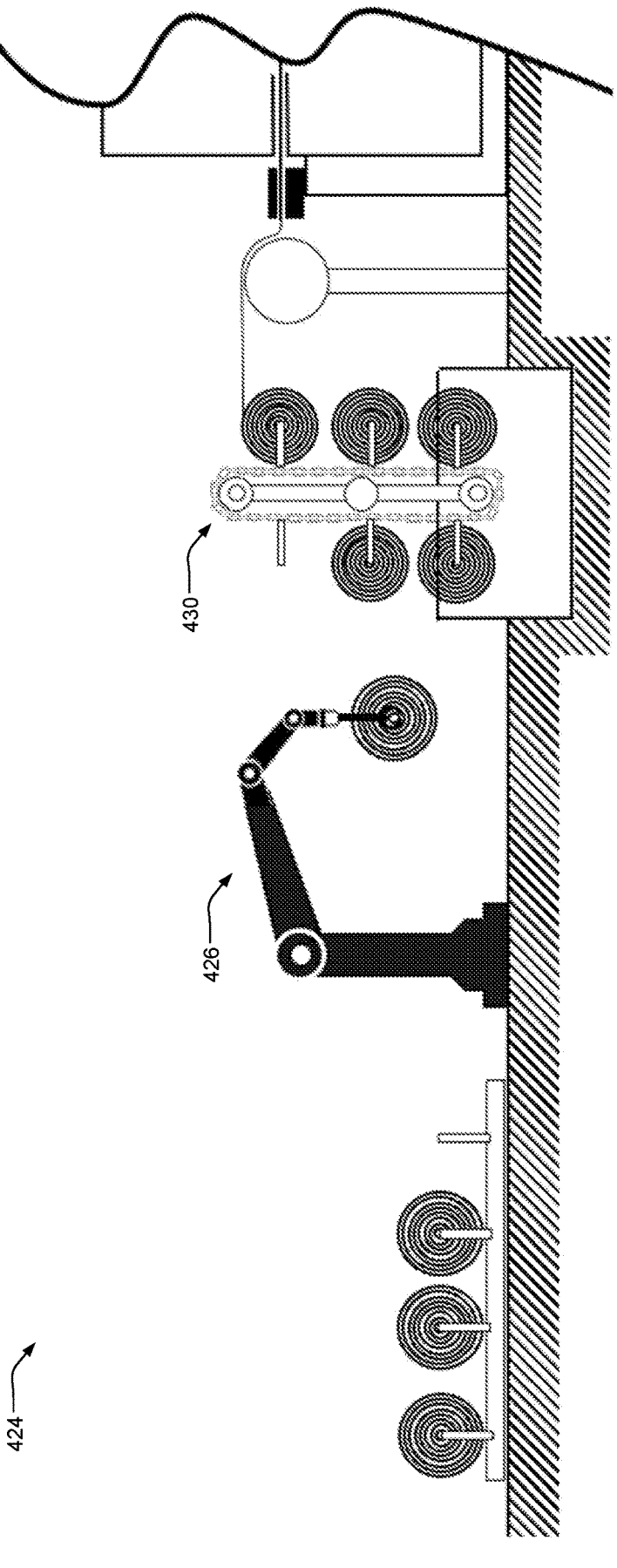
FIG. 10 is a schematic of an example forming over part system.

FIG. 10 is a schematic of an example forming over part system 424 including an example robot 426. The forming over part system 424 is the same as the forming over part system 324, with the exception of the film positioning device. A film positioning device 430 of the forming over part system 424 may be the same as the film positioning device 260, having a film conveyor style. Thus, the forming over part system 424 will not be re-described in detail.

Figure 11:
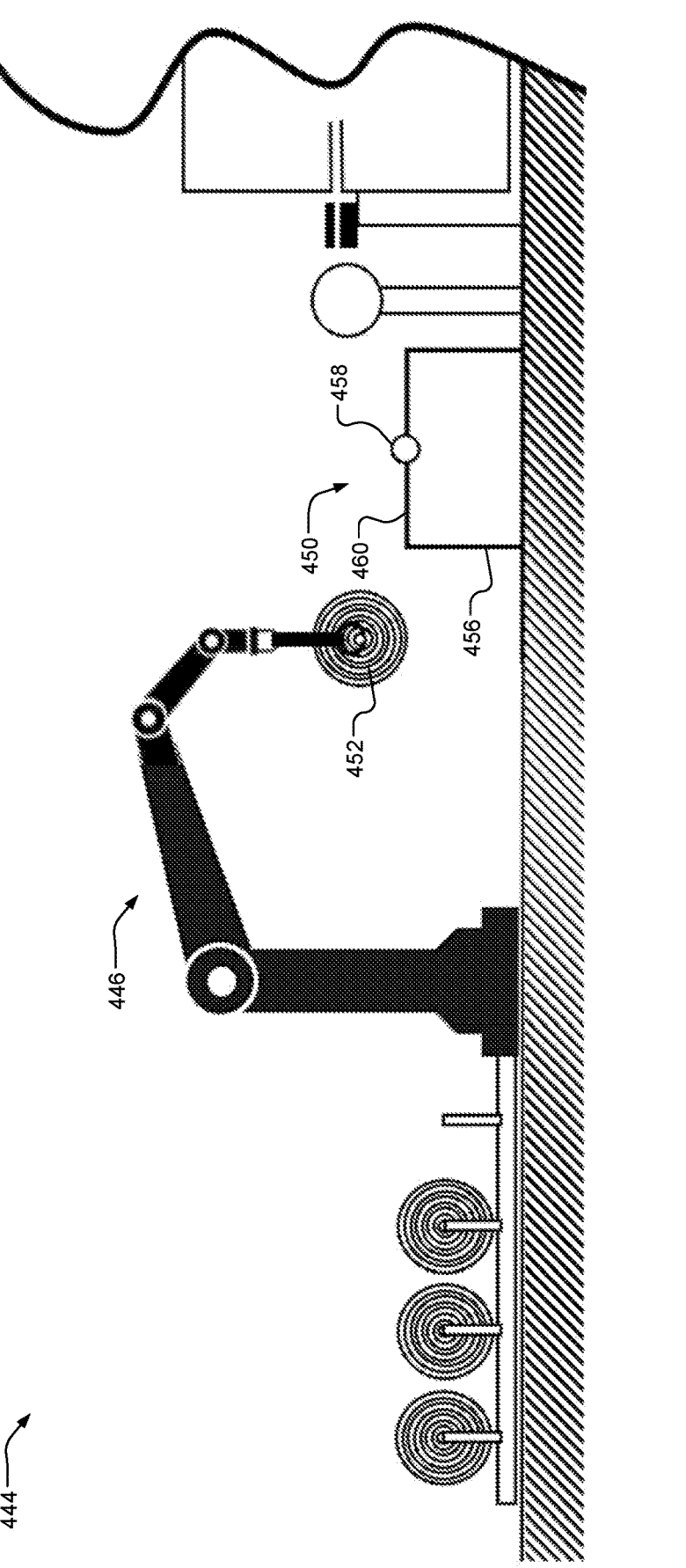
FIG. 11 is a schematic of an example forming over part system.

FIG. 11 is a schematic of an example forming over part system 444 including an example robot 446. The forming over part system 444 is the same as the forming over part systems 324, 424, with the exception of the film positioning device. Thus, the forming over part system will not be re-described in detail.

The forming over part system 444 includes a film holding device 450. The film holding device 450 is configured to hold a single paint film roll 452. The film holding device 450 includes a device stand 456 and a roll holder 458. The roll holder 458 is disposed at a top stand end 460 of the device stand 456.

Each of the plurality of paint film rolls 452 may include a first rod (e.g., first rod 220, 370) that extends through the respective paint film roll 452. The robot 446 is configured to secure and release the paint film roll 452 from the roll holder 458 using the first rod. As described with reference to FIG. 3, the roll holder 458 may be the same as the roll holder 204 and will not be redescribed in detail.

In some configurations, the first rod may not extend through each of the plurality of paint film rolls 452. As described with reference to FIG. 4, the roll holder 458 may be the same as the roll holder 230. In another example, and as described with reference to FIG. 5, the roll holder 458 may be the same as the roll holder 240. Thus, the roll holder 458 will not be redescribed in detail.

Figure 12:
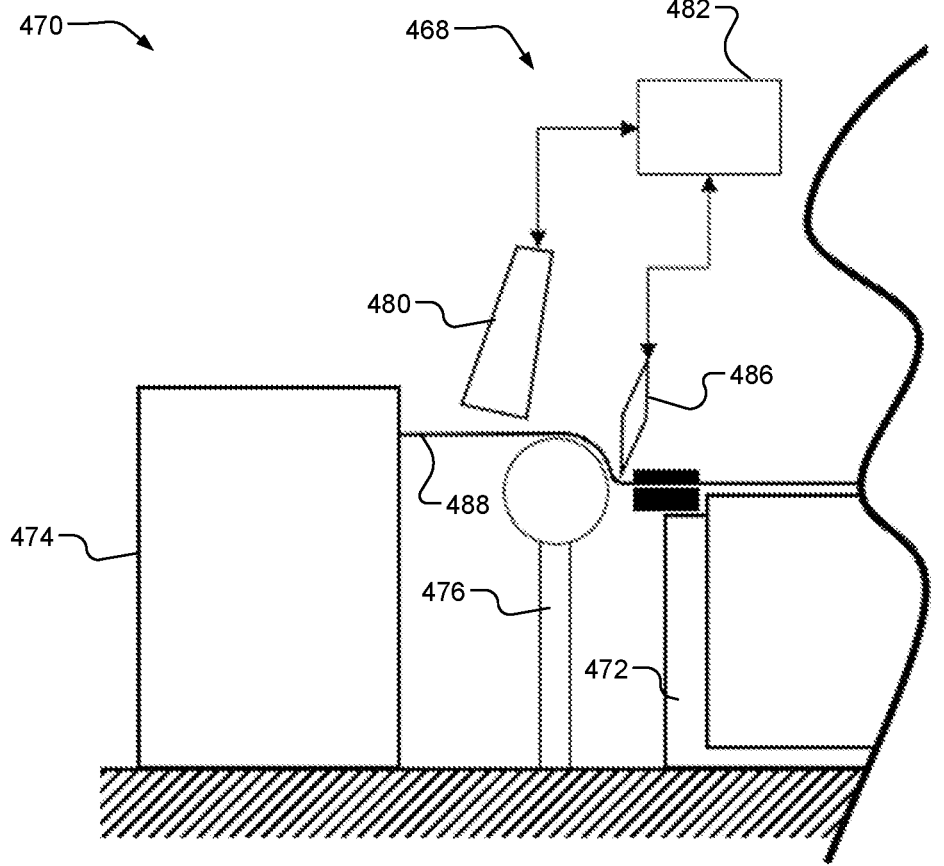
FIG. 12 is a schematic of an example defect detection system of a forming over part system.

FIG. 12 is a schematic of an example defect detection system 468 of a forming over part system 470.

The forming over part system 470 includes a film adhering device 472, a film positioning device 474, a film support wheel 476, and the defect detection system 468. The defect detection system 468 includes a camera 480 and a control module 482.

The film adhering device 472 is the same as the film adhering device 132 of the forming over part system 130. Thus, the film adhering device 472 will not be re-described in detail.

In one example, the film positioning device 474 is the same as the film positioning device 134. In another example, the film positioning device 474 is the same as the film positioning device 260. In yet another example, the film positioning device 474 is the same as the film holding device 450. Thus, the film positioning device 474 will not be re-described in detail.

The film support wheel 476 is disposed between the film positioning device 474 and the film adhering device 472. The film support wheel 476 is the same as the film support wheel 136 of the forming over part system 130 and thus will not be re-described in detail.

A blade 486 is disposed between the film support wheel 476 and the film positioning device 474. The blade 486 is pressed into a paint film 488 of a paint film roll and used to cut the paint film 488.

The camera 480 is disposed between the film support wheel 476 and the film positioning device 474. In one example, the camera 480 is an in-line scanning camera. The camera 480 is configured to, e.g., continuously capture images of the paint film 488 as the paint film 488 is passed by the camera 480. In one example, the camera 480 is configured to capture images having a height of one pixel and a width equal to a width of the paint film roll.

The control module 482 is configured to detect whether a defect in the paint film 488 exists based on the images captured by the camera 480. When a defect is detected, the blade 486 is used to cut a piece of the paint film 488 having the defect and the film adhering device 472 is configured to scrap the piece, based on input from the control module 482.

In one example, the control module 482 determines a depth of a top surface of the paint film 488 based on the images. More specifically, the control module 482 is configured to determine a first depth value in a first area of the paint film 488 and a second depth value in a second area of the paint film 488. The control module 482 is configured to determine whether a difference between the first and second depth values is greater than a predetermined value. If the difference between the first and second depth values is greater than a predetermined value, the control module 482 identifies the paint film 488 to have a defect.

In another example, the control module 482 determines a color value of the paint film 488 based on the images. For example, the control module 482 is configured to determine a first red green blue (RGB) value in a first area of the paint film 488 and a second RGB value in a second area of the paint film 488. The control module 482 is configured to determine whether a difference between the first and second RGB values is greater than a predetermined value. If the difference between the first and second RGB values is less than a predetermined value, the control module 482 identifies the paint film to have a defect.

In yet another example, the control module 482 determines a contrast value of the paint film 488 based on the images. For example, the control module 482 is configured to determine a first contrast value in a first area of the paint film 488 and a second contrast value in a second area of the paint film 488. The control module 482 is configured to determine whether a difference between the first and second contrast values is greater than a predetermined value. If the difference between the first and second contrast values is greater than a predetermined value, the control module 482 identifies the paint film 488 to have a defect.

The control module 482 may determine whether the paint film 488 has a defect using any combination of the depth, RGB, and contrast values, based on the images captured by the camera 480. The control module 482 may determine whether the paint film 488 has a defect using another suitable value, based on the images captured by the camera 480.

Figure 13:
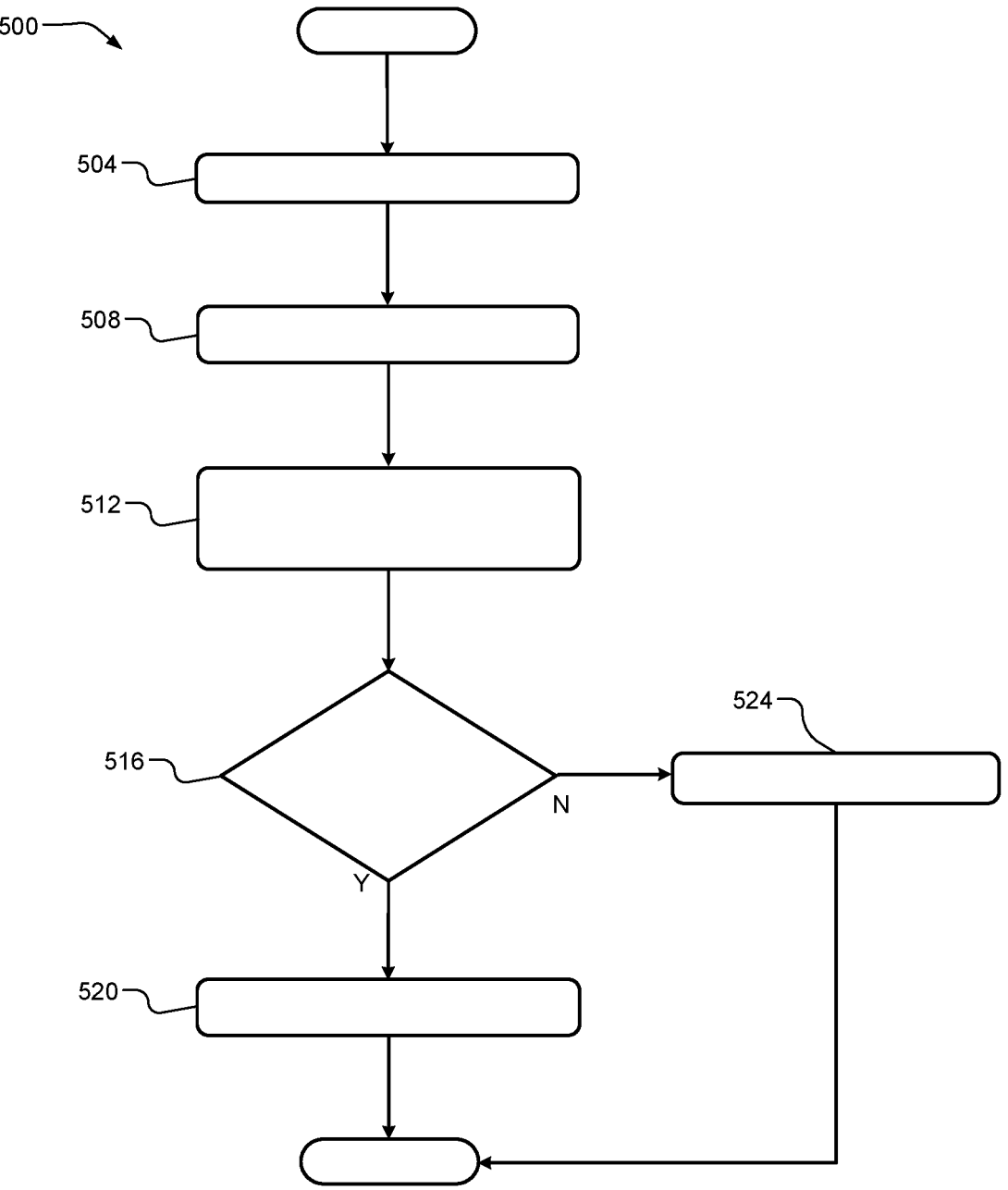
FIG. 13 is a flowchart for a method for detecting a defect in a component.

FIG. 13 is a flowchart for a method for detecting a defect in a component of a vehicle using the example detect detection system 468.

At 504, the camera 480 captures images of the paint film 488. The camera 480 may continuously capture images of the paint film 488 as the paint film 488 is passed by the camera 480. The camera 480 may capture images having a height of one pixel and a width equal to a width of the paint film roll.

At 508, the control module 482 determines an image characteristic of the image. Examples of the image characteristic include a depth of a top surface of the paint film 488, a color value of the paint film 488, and a contrast value of the paint film 488.

At 512, the control module 482 determines a difference between a first image characteristic of a first area of the paint film 488 and a second image characteristic of a second area of the paint film. The first and second areas may be in the same image or in different images.

In one example, the control module 482 determines a difference between a first depth value in the first area and a second depth value in the second area. In another example, the control module 482 determines a difference between a first RGB value in the first area and a second RGB value in the second area. In yet another example, the control module 482 determines a difference between a first contrast value in the first area and a second contrast value in the second area.

At 516, the control module 482 determines whether the difference is greater than a predetermined value. If 516 is true (e.g., the difference is greater than the predetermined value), the method continues to 520. If 516 is false (e.g., the difference is less than or equal to the predetermined value), the method continues to 524.

At 520, the control module 482 detects a defect in the paint film 488. In one example, the blade 486 cuts a piece of the paint film 488 having the defect and the film adhering device 472 scraps the piece.

At 524, the control module 482 does not detect a defect in the paint film 488. The blade 486 cuts a piece of the paint film 488 having no defect and the film adhering device 472 adheres the piece onto the component of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A forming over part system comprising:
a first roll of a first paint film;
a second roll of a second paint film;
a film adhering device receiving the first paint film, wherein the film adhering device is configured to adhere the first paint film to a component of a vehicle; and
a film positioning device configured to:
hold the first and second rolls; and
based on actuation of an actuator, position the second roll of the second paint film to the film adhering device while the film adhering device is applying the first paint film to the component,
wherein the film positioning device is a film revolver.

2. The forming over part system of claim 1, wherein the first paint film has a first color and the second paint film has a second color that is different than the first color.

3. The forming over part system of claim 1, further comprising a robot having an end effector that is configured to grasp and release the second roll.

4. The forming over part system of claim 1, further comprising a film support wheel disposed between the film adhering device and the film positioning device and the film support wheel is configured to guide the second paint film from the film positioning device to the film adhering device.

5. The forming over part system of claim 4, further comprising a blade disposed between the film support wheel and the film positioning device, wherein the blade is configured to cut the second paint film.

6. The forming over part system of claim 5, further comprising a camera disposed between the film support wheel and the film positioning device and configured to capture an image of the second paint film.

7. The forming over part system of claim 6, further comprising a control module configured to detect whether a defect exists in the second paint film based on the image captured by the camera.

8. A forming over part system comprising:

a first roll of a first paint film;

a second roll of a second paint film;

a film adhering device receiving the first paint film, wherein the film adhering device is configured to adhere the first paint film to a component of a vehicle; and a film revolver having a plurality of slots, wherein the film revolver is configured to:

hold the first and second rolls; and based on actuation of an actuator, position the second roll of the second paint film to the film adhering device while the film adhering device is applying the first paint film to the component.

9. The forming over part system of claim 8, wherein the film revolver includes a housing that has the plurality of slots and a core disposed within the housing.

10. The forming over part system of claim 9, wherein the film revolver rotates about the core, based on actuation of the actuator.

11. The forming over part system of claim 9, wherein each of the plurality of slots are annularly spaced apart about the core and one of the plurality of slots is configured to hold the second roll.

12. The forming over part system of claim 8, further comprising:

a robot having an end effector that is configured to grasp and release the second roll, wherein the robot is configured to move the second roll between a first position and a second position based on input from a control module.

13. The forming over part system of claim 12, wherein the first position is a position of one of the plurality of slots of the film revolver and the second position is a position on a paint film roll stand.

\* \* \* \* \*